United States Patent
Li

(10) Patent No.: US 6,681,627 B1
(45) Date of Patent: Jan. 27, 2004

(54) LEVEL SENSING SAFETY DEVICE FUNCTIONABLE IN FALL-OVER POSITION

(75) Inventor: Jui-Yang Li, Tainan Hsien (TW)

(73) Assignee: Young-G Enterprise Corporation, Tainan Hsien (TW)

( * ) Notice: Subject to any disclaimer, the term of this patent is extended or adjusted under 35 U.S.C. 154(b) by 0 days.

(21) Appl. No.: 10/233,628

(22) Filed: Sep. 4, 2002

(51) Int. Cl.[7] .......................... G01F 23/30; G08B 21/00
(52) U.S. Cl. ..................... 73/307; 73/313; 73/314; 340/686.1; 340/687; 340/689; 200/84 C
(58) Field of Search .................. 73/290 R, 314, 73/307, 313; 200/84 C, 187; 340/623, 686.1, 687, 689

(56) References Cited

U.S. PATENT DOCUMENTS

| | | | | |
|---|---|---|---|---|
| 4,064,755 A | * | 12/1977 | Bongort et al. | 73/313 |
| 4,384,184 A | * | 5/1983 | Alvarez | 200/84 C |
| 5,281,858 A | * | 1/1994 | Langved | 307/118 |
| 5,646,601 A | * | 7/1997 | Wallace et al. | 340/686.1 |
| 5,880,423 A | * | 3/1999 | Li | 200/84 C |
| 6,230,561 B1 | * | 5/2001 | Li | 73/322.5 |

* cited by examiner

*Primary Examiner*—Hezron Williams
*Assistant Examiner*—Katina Wilson
(74) *Attorney, Agent, or Firm*—Rosenberg, Klein & Lee

(57) ABSTRACT

A safety device for water dispenser includes a magnetic tube, and a float. The tube sticks up on bottom of a water container. A first, and a second magnet switches are disposed in the tube, and connected in series. The float is movably fitted around the tube, and has a magnet ring, which can, when moved close to the first switch, make the first switch become conductible if there is sufficient water in the container. A weighted magnet ring is movably fitted around the tube. The weighted ring is normally close to the second switch due to gravity to make the same become conductible. Therefore, heating device of the dispenser can be activated when there is sufficient water. When the container are made to fall over, the weighted ring moves away from the corresponding switch to leave the same not-conductible, preventing the heating device from being activated.

9 Claims, 5 Drawing Sheets

LEVEL SENSING SAFETY DEVICE FUNCTIONABLE IN FALL-OVER POSITION

BACKGROUND OF THE INVENTION

1. Field of the Invention

The present invention relates to a level sensing safety device, more particularly a level sensing safety device, which is used on a drinking water dispenser for effecting cut-off of electricity when level of water in the dispenser is too low, and which can still function to effect cutting of electricity when the water dispenser is made to fall over to become virtually empty by unexpected external force.

2. Brief Description of the Prior Art

Level sensors are indispensable in drinking water dispensers that are equipped with heating devices to heat and boil water contained therein so that when water is running out, power to the heating devices can be automatically cut off to prevent the heating devices from over-heating or being burnt, avoiding danger and damage to the dispensers.

Referring to FIG. 7, a conventional level sensor includes a magnetic tube 21, and a float 22.

The magnetic tube 21 is formed with an annular trench 23 a upper end portion, and has a magnet switch 25, and conducting wires received therein. The conducting wires are connected to the magnet switch 25, and wires 26. The float 22 has a central through hole, and has a magnet ring 27 received therein and disposed around the central through hole.

In combination, the magnetic tube 21 is fixedly disposed on the bottom of the water container in an upright position. The float 22 is passed around the magnetic tube 21 at the central hole thereof, and a C-shaped engaging ring 24 is fitted onto the annular trench 23 of the magnetic tube 21 to prevent the float 22 from separating from the magnetic tube 21.

When level of water contained in the container of the dispenser is high enough to support the float 22 at the upper portion of the magnetic tube 21, the magnet ring 27 is close to the magnet switch 25 to make the same conductible so that electric current is allowed to travel through the same, thus allowing activation of a heating device (not shown) of the water dispenser. When water is running out, and the float 22 moves down to lower portion of the magnetic tube 21, the magnet ring 27 is farther away from the magnet switch 25 to become incapable of making the same conductible; thus, undesired activation of the beating device is prevented.

However, the level sensor is found to have a disadvantage that when the water dispenser is made to fall over by unexpected external force, and causes the water to flow out of the container, the float 2 move to the C-shaped ring 24, causing the magnet ring 27 to be close to the magnet switch 25 to make the same conductible. Consequently, the heating device is activated by mistake to cause danger when there is virtually no water in the dispenser container.

SUMMARY OF THE INVENTION

It is a main object of the present invention to provide a level sensing safety device to a drinking water dispenser that can effect cut-off of electricity when level of water in the dispenser is too low, and which can still function to effect cut-off of electricity when the water dispenser is made to fall over to become empty by unexpected force.

The present level sensing safety device for water dispenser includes a magnetic tube, and a float. The tube is disposed on the bottom of a water container of the dispenser. (A first, and a second magnet switches are disposed in the tube, and connected in series. The float is movably fitted around the tube, and has a magnet ring, which can be moved close to the first switch to make the first switch same become conductible if there is sufficient water in the container. A weight is movably fitted around the magnetic tube at a central through hole thereof. The weight has a magnet ring disposed around the central hole thereof, and has bigger density than water. The weighted ring is normally close to the second switch due to gravity to make the same become conductible. Thus, heating device of the dispenser can be activated when there is sufficient water. When the container are made to fall over, the weighted ring moves away from the corresponding switch to make the same become not-conductible to prevent the heating device from being activated.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
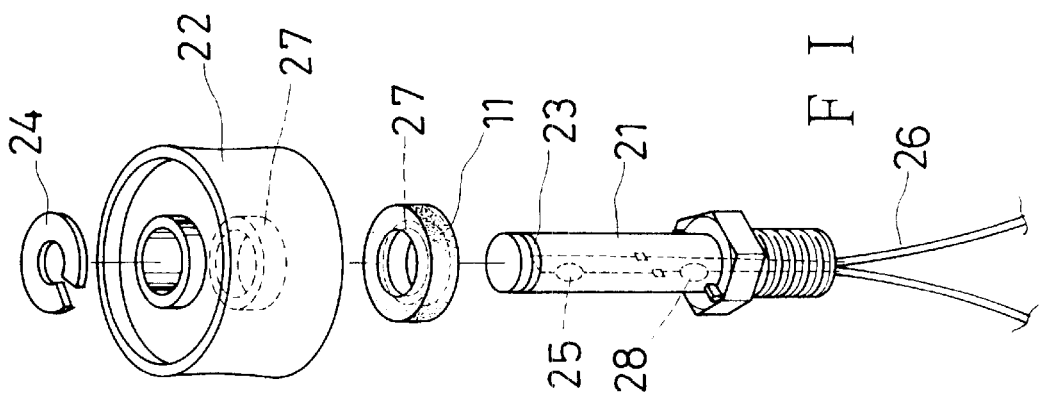
FIG. 1 is an exploded perspective view of the level sensing safety device for a drinking water dispenser of a first embodiment of the present invention.
Figure 7:
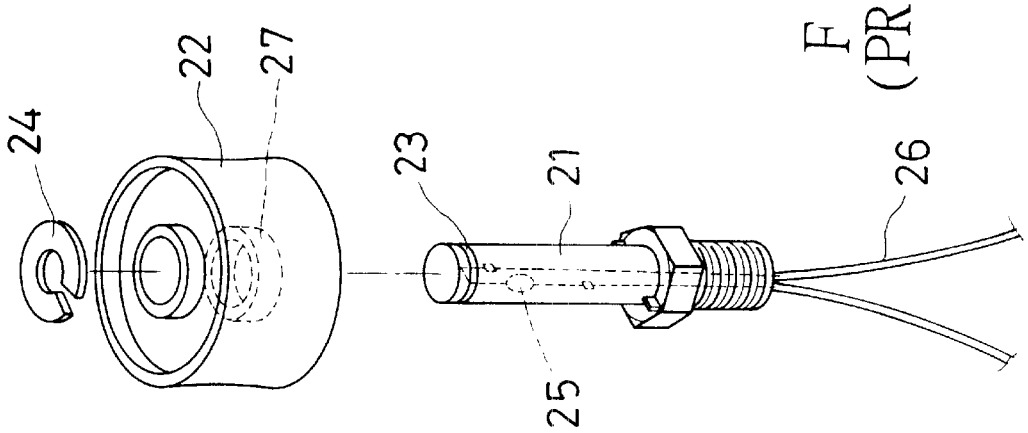
FIG. 7 is an exploded perspective view of the conventional level sensor as described in the Background.

Referring to FIG. 1, a level sensing safety device for a drinking water dispenser according to the present invention includes a magnetic tube 21, a float 22, and a weight 11.

The magnetic tube 21 is disposed on the bottom of a water container of the dispenser in an upright position. The magnetic tube 21 has a first magnet switch 25, and a second magnet switch 28 respectively disposed in an upper, and a lower end portions thereof. The magnetic tube 21 has an annular trench 23 on an upper end portion. The magnet switches 25, 28 are connected in series with conducting wires 26, which are connected to an electric heating device (not shown) provided to the water dispenser.

The weight 11 is movably fitted around the magnetic tube 21 at a central through hole thereof. The weight 11 has a magnet ring 27 disposed around the central hole thereof, and has bigger density than water.

The second magnet 28 is located in such a manner that when the container stands upright, and when the weight 11 moves to a lower end of the magnetic tube 21 due to gravity, the magnet ring 27 of the weight 11 is close to the second magnet switch 28 of the magnetic tube 21, making the second switch 28 become conductible, in other words, the second switch 28 is made to allow electric current to travel through by the magnet ring 27.

The float 22 is positioned above the weight 11, and movably fitted around the magnetic tube 21 at a central through hole thereof The float 22 has a magnet ring 27 disposed around the central hole thereof and has smaller density than water. In addition, a C-shaped engaging ring 24 is fitted around the trench 23 to prevent the float 22 from separating from the magnetic tube 21. Therefore, when the water container and the magnetic tube 21 are in upright position, the float 22 will move up and down along the magnetic tube 21 together with level of water if the level is lower than a certain height. And, when level of the water is higher than the certain height, the float 22 will be moved close to the C-shaped ring 24 disposed near the top of the tube 21.

The magnet ring 27 of the float 22 is close to the first magnet switch 25 to make the switch 25 become conductible allowing electric current to travel through when level of water in the container is capable of supporting the float 22 at the upper end of the magnetic tube 21 positioned in upright position.

Figure 2:
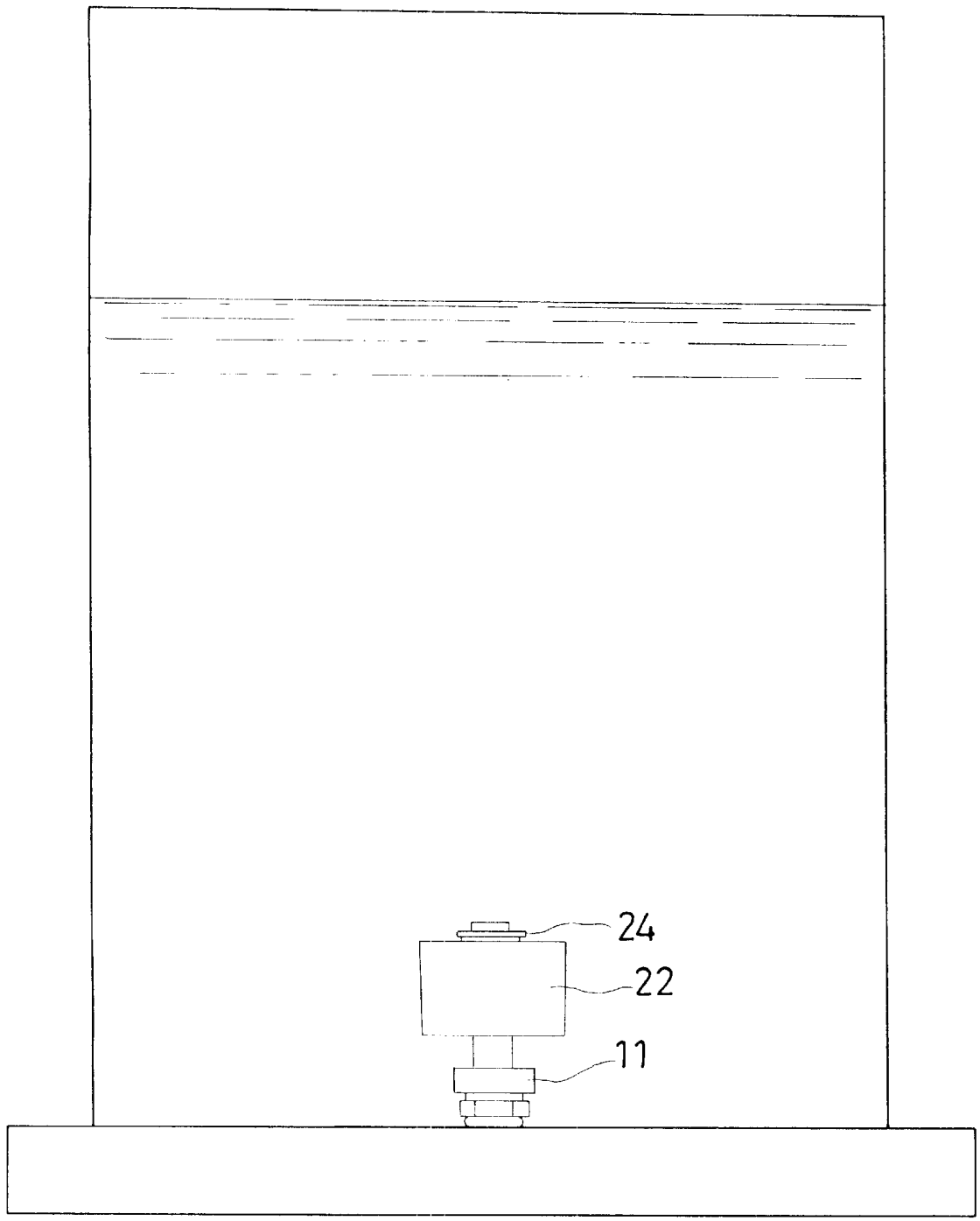
FIG. 2 is a view of the level sensing safety device of the first embodiment of the present invention in a water dispenser full of water.

Referring to FIG. 2, when level of water in the container is high enough, i.e. higher than top of the magnetic tube 21, both the first and the second magnet switches 25, 28 are made to become conductible by the corresponding magnet rings 27,27, allowing the heating device to be activated to heat the water if necessary.

Figure 3:
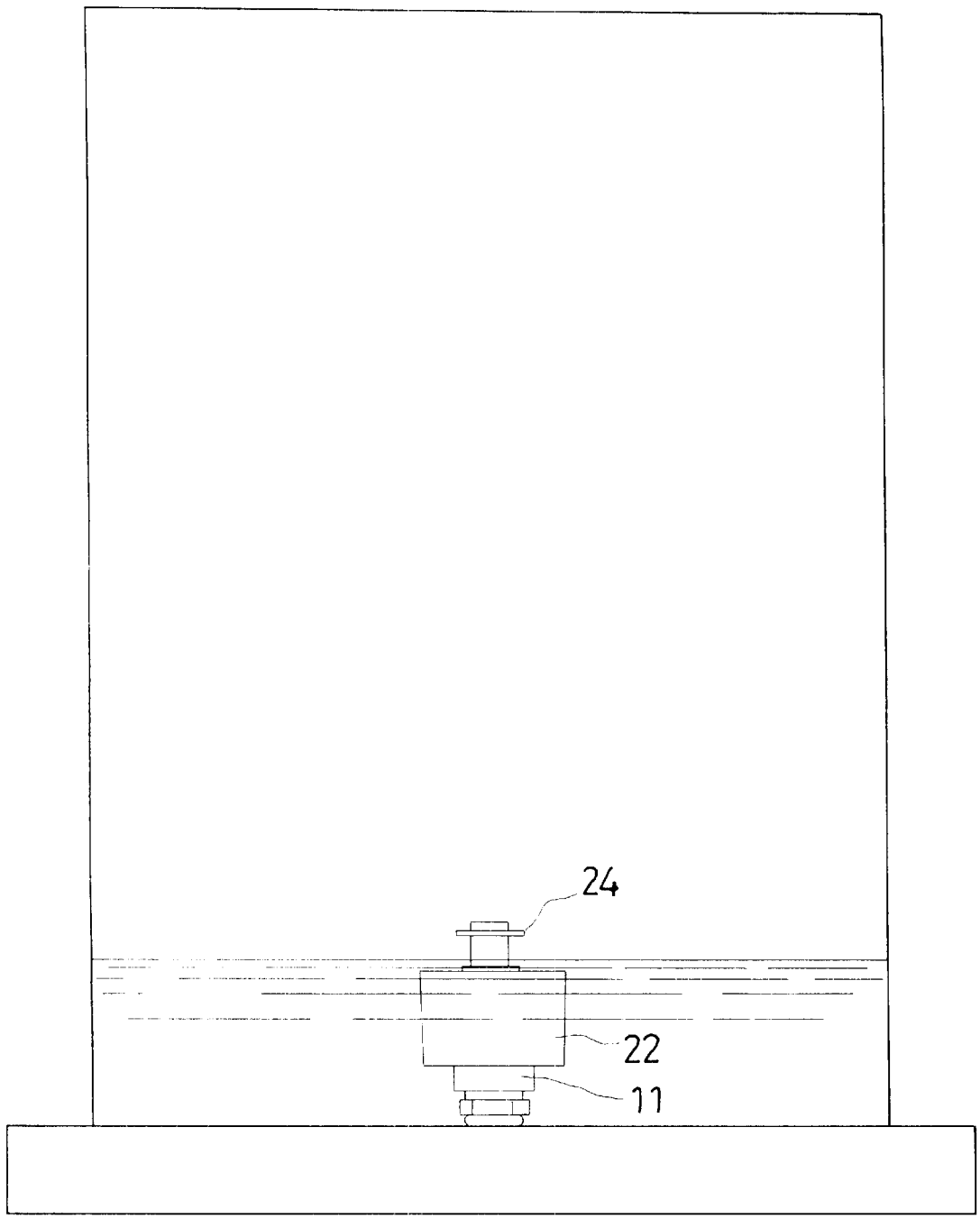
FIG. 3 is a view of the level sensing safety device of the first embodiment of the present invention in a virtually empty water dispenser.

Referring to FIG. 3, when water in the container is running out, i.e. level of the water is much lower than the top of the magnetic tube 21, the second switch 28 is still made to be conductible by the corresponding magnet 27 but the first one 25 is not. Consequently, the heating device cannot be activated by the power.

Figure 4:
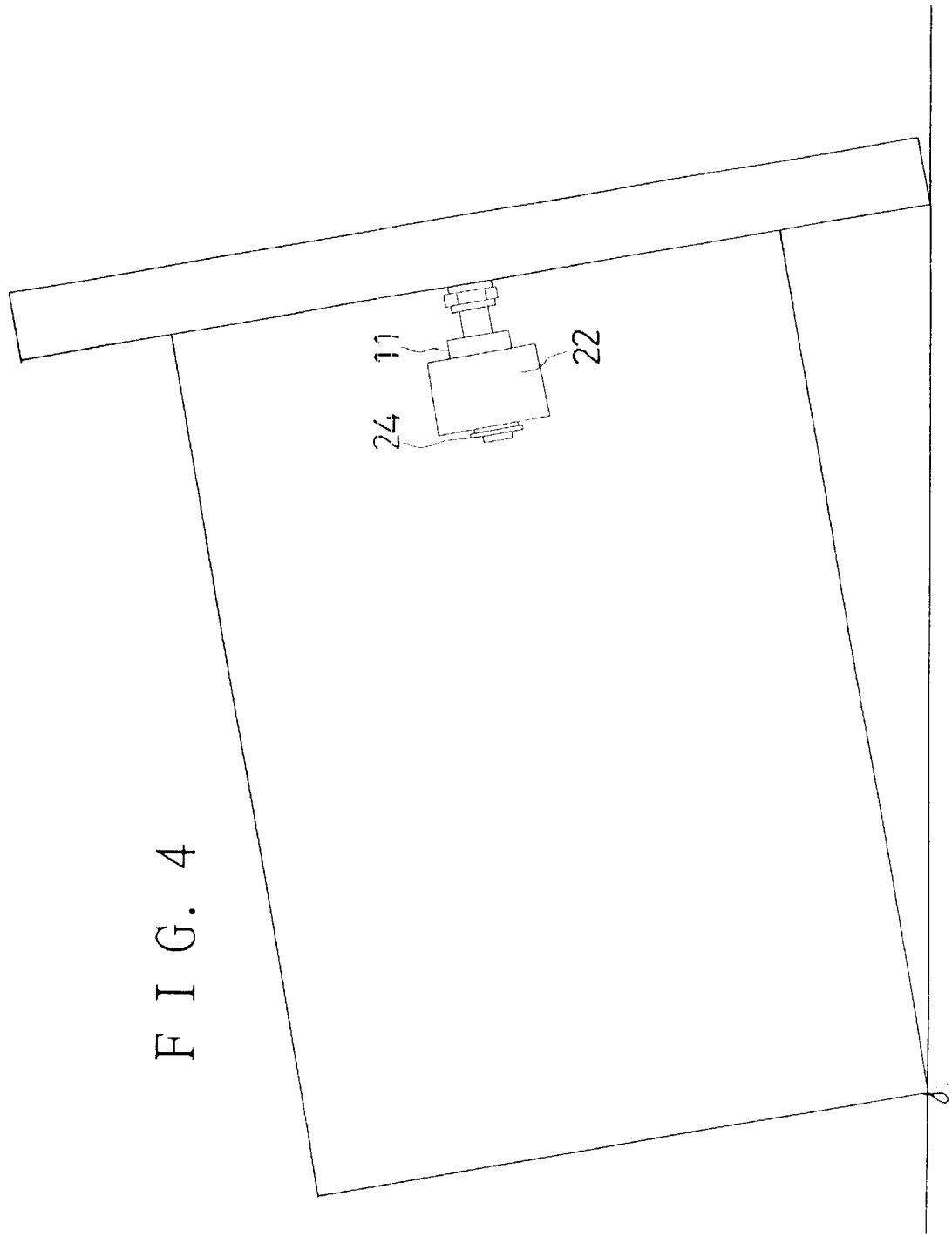
FIG. 4 is a view of the level sensing safety device of the first embodiment in a fall-over water dispenser.
Figure 6:
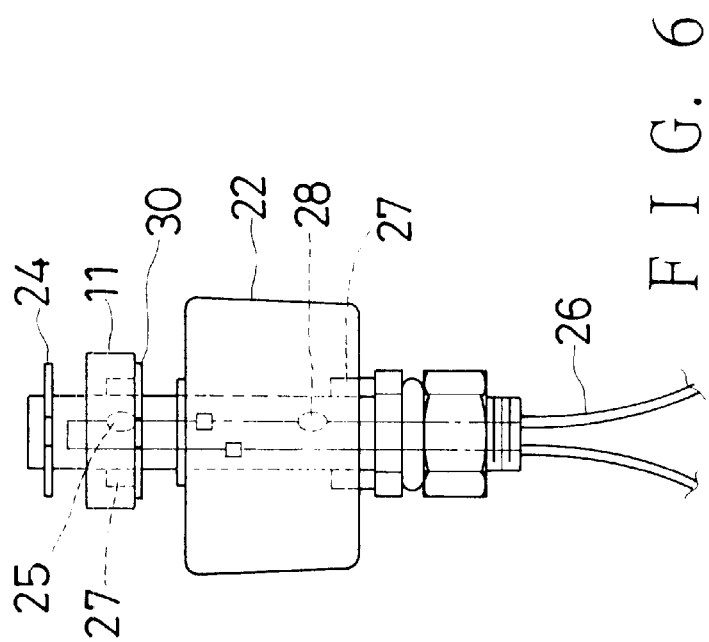
FIG. 6 is a cross-sectional view of the level sensing safety device of the second embodiment.

Referring to FIG. 4, when the magnetic tube 21 together with the container are made to fall over to cause water to be virtually emptied, the weight 11 moves away from the lower end of the magnetic tube 21, and the magnet ring 27 of the weight 11 is farther away from the magnet switch 28, leaving the magnet switch 28 unable to allow electric current to travel through. Thus, the electric heating device is prevented from being activated by mistake when the water dispenser is caused to fall over by unexpected force to result in lack of water in the container.

Figure 5:
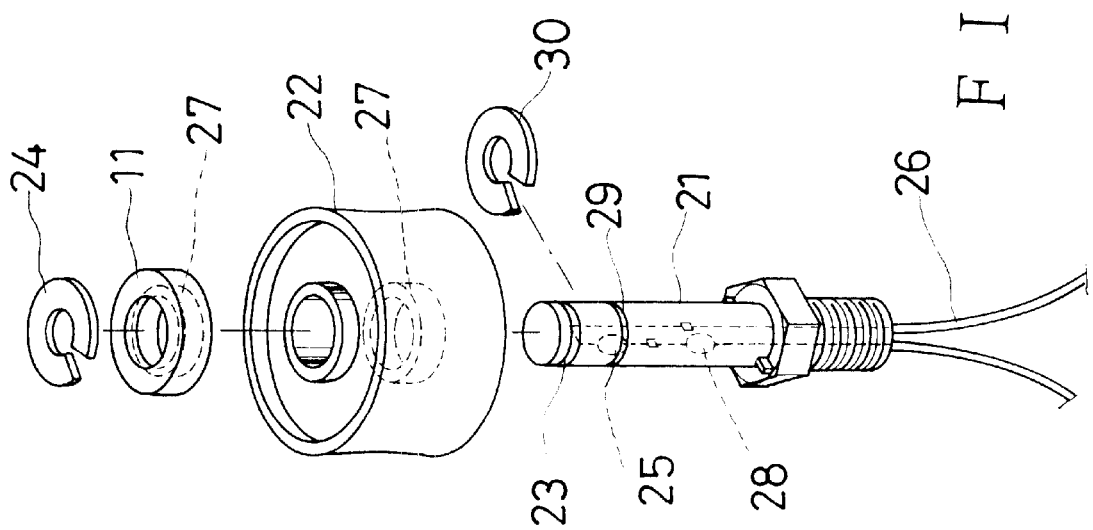
FIG. 5 is an exploded perspective view of the level sensing safety device of the second embodiment of the present invention.

Referring to FIG. 5, a level sensing safety device of the second embodiment includes a magnetic tube 21, a float 22, and a weight 11.

The magnetic tube 21 is disposed in a way like that of the first embodiment. The magnetic tube 21 has magnet switches 25, and 28 respectively disposed in an upper, and a lower end portions thereof The magnetic tube 21 has upper, and lower annular trenches 23, 29 formed on an upper end, and below the magnet switch 23 respectively; a first section of the tube 21 is defined by both the annular trench 29 and the lower end of the tube 21, and a second section of the tube 21 by both the annular trenches 23 and 29. The magnet switches 25, 28 are connected in series with conducting wires 26, which are connected to an electric heating device provided to the water dispenser.

The float 22 is up and down movably fitted around the magnetic tube 21 at a central through hole, and an engaging C-shaped ring 30 is firmly fitted onto the trench 29 to prevent the float 22 from moving further up. The float 22 has a magnet ring 27 disposed around the central hole thereof and has smaller density than water. Therefore, when the water container and the magnetic tube 21 is in upright position, the float 22 will move up and down along the lower first section of the magnetic tube 21 together with level of water if the level of water is lower than a certain height. The magnet ring 27 of the float 22 is close to the magnet switch 28 to make the switch 28 become conductible when level of water in the container is capable of supporting the float 22 at the upper end of the first section of the magnetic tube 21, which is currently positioned in upright position together with the water container.

The weight 11 is up and down movably fitted around the upper second section of the magnetic tube 21 at a central through hole thereof. A C-shaped engaging ring 24 is fitted around the trench 23 to prevent the weight 11 from fall off. The weight 11 has a magnet ring 27 disposed around the central hole thereof, and has bigger density than water. The magnet switch 25 is located in such a manner that when the container stands upright, and when the weight 11 moves to a lower end of the second section of the tube 21 due to gravity, the magnet ring 27 of the weight 11 is close to the magnet switch 25, making the second switch 25 become conductible.

When level of water in the container is high enough, both of the magnet switches 25, 28 are made to become conductible by the corresponding magnet rings 27,27, allowing the heating device to be activated to heat the water.

When water in the container is running out, e.g. level of the water is much lower than the C-shaped ring 30, the upper switch 25 is still made to be conductible by the corresponding magnet ring 27 but the lower switch 28 is not due to displacement of the float 22. Consequently, the heating device cannot be activated by the power.

When the magnetic tube 21 together with the container are made to fall over to cause water to be virtually emptied, the weight 11 moves away from the lower end of the upper second section of the tube 21, and the magnet ring 27 of the weight 11 is farther away from the corresponding magnet switch 25, leaving the same unable to conduct electricity. Thus, the electric heating device is prevented from being activated by mistake when the water dispenser is caused to fall over to result in lack of water in the container by unexpected force.

From the above description, it can be easily understood that the level sensing safety device of the present invention still can function to prevent the heating device from being activated wrongly when the water dispenser is made to fall over to become virtually empty by unexpected force. Therefore, the present level sensing safety device is relatively safe to use as compared to the conventional one as described in the Background.

What is claimed is:

1. A level sensing safety device functionable in fall-over position, comprising:

a magnetic tube extending upward from a bottom of a water container; the magnetic tube having first and second magnet switches respectively disposed in an upper, and a lower ends thereof; the magnet switches being connected in series with conducting wires to form a switching circuit segment connected to an electric device provided to the water container;

a safety deactivating portion including a weight movably fitted around the magnetic tube at a central through hole; the weight having a magnet ring disposed therein; the weight being greater in density than water to be disposed at a lower end of the magnetic tube due to gravity when the container stands upright, allowing the magnet ring to be close in proximity to the second magnet switch to make the second switch conductible;

the weight being displaced away from the second switch due to gravity when the container is made to fall over so that the magnet ring leaves the second switch incapable of conducting electricity;

a buoyant activating portion including a float movably fitted around the magnetic tube above the weight at a central through hole; the float having a magnet ring disposed therein; the float being close to the first magnet switch when a level of water contained in the container is capable of supporting the float at the upper end of the magnetic tube so that the magnet ring thereof makes the first switch become conductible; the float moving down away from the first switch when the level of water in the container recedes so that the magnet ring leaves the first switch incapable of conducting electricity;

the safety deactivating portion being thereby operable to activate the switching circuit segment in cooperation with the buoyant activating portion when the water container is disposed in an upright operative position, and to deactivate the switching circuit segment independent of the buoyant deactivating portion when the water container is disposed in a tipped inoperative position.

2. The level sensing safety device functionable in fall-over position as claimed in claim 1, wherein the magnet rings are respectively disposed around the central through hole of the weight, and the central through hole of the float.

3. The level sensing safety device functionable in fall-over position as claimed in claim 1, wherein the electric device is provided for heating water contained in the container.

4. A level sensing safety device functionable in fall-over position, comprising:

a magnetic tube extending upward on from a bottom of a water container; the magnetic tube having a lower first section, and an upper second section respectively housing a first magnet switch, and a second magnet switch therein; the magnet switches being connected in series with conducting wires to form a switching circuit segment connected to an electric heating device provided in the water container;

a safety deactivating portion including a weight movable along the upper second section of the magnetic tube; the weight having a magnet ring disposed therein; the weight being greater in density than water to be disposed at a lower end of the upper second section of the tube due to gravity when the container stands upright, allowing the magnet ring to be close in proximity to the second magnet switch to make the second switch conductible;

the weight moving towards a distal end of the second section away from the second switch due to gravity when the container is made to fall over so that the magnet ring leaves the second switch incapable of conducting electricity; and, a buoyant activating portion including a float movable along the lower first section of the magnetic tube; the float having a magnet ring disposed therein; the float being close to the first magnet switch when a level of water contained in the container is capable of supporting the float at the upper end of the lower section of the tube so that the magnet ring thereof makes the first switch become conductible; the float moving down away from the first switch when the level of water in the container recedes so that the magnet ring leaves the first switch incapable of conducting electricity;

the safety deactivating portion being thereby operable to activate the switching circuit segment in cooperation with the buoyant activating portion when the water container is disposed in an upright operative position, and to deactivate the switching circuit segment independent of the buoyant deactivating portion when the water container is disposed in a tipped inoperative position.

5. A liquid level sensitive switching apparatus having safety cutoff for a liquid container comprising:

an upwardly extending magnetic tube, said magnetic tube having respectively disposed within first and second axial sections thereof first and second magnet switches coupled in series one with the other to define a switching circuit segment;

a buoyant activating portion coupled in axially displaceable manner to said magnetic tube for displacement responsive to a liquid level within the liquid container, said buoyant activating portion including a float having a first magnet member for selectively actuating said first magnet switch in proximity responsive manner;

a safety deactivating portion coupled in axially displaceable manner to said magnetic tube for displacement responsive to the axial orientation thereof, said safety deactivating portion including a weight greater in density than the liquid within the liquid container, said weight including a second magnet member for selectively actuating said second magnet switch in proximity responsive manner;

said safety deactivating portion being thereby operable to activate said switching circuit segment in cooperation with said buoyant activating portion when the liquid container is disposed in an upright operative position, and to deactivate said switching circuit segment independent of said buoyant deactivating portion when the liquid container is disposed in a tipped inoperative position.

6. The liquid level sensitive switching apparatus as recited in claim 5 further comprising at least a first engaging ring coaxially coupled to said magnetic tube for limiting said axial displacement of said buoyant activating portion.

7. The liquid level sensitive switching apparatus as recited in claim 6 wherein said first axial segment of said magnetic tube is disposed axially above said second axial segment thereof.

8. The liquid level sensitive switching apparatus as recited in claim 6 wherein said first axial segment of said magnetic tube is disposed axially below said second axial segment thereof.

9. The liquid level sensitive switching apparatus as recited in claim 8 further comprising a second engaging ring coupled above to said magnetic tube above said second axial segment thereof for limiting said axial displacement of said safety deactivating portion, said first engaging ring being coupled to said magnetic tube between said first and second axial segments thereof.

* * * * *